(12) United States Patent
Becker et al.

(10) Patent No.: US 6,697,078 B2
(45) Date of Patent: *Feb. 24, 2004

(54) TRAP SHAPING

(75) Inventors: Douglas Richard Becker, Ayer, MA (US); Richard A. Dermer, Issaquah, WA (US); Dennis Mercer, Auburn, NH (US)

(73) Assignee: Adobe Systems Incorporated, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 86 days.

(21) Appl. No.: 09/240,946

(22) Filed: Jan. 29, 1999

(65) Prior Publication Data

US 2002/0085005 A1 Jul. 4, 2002

(51) Int. Cl.[7] .................................................. G09G 5/02
(52) U.S. Cl. ...................................................... 345/589
(58) Field of Search ................................. 345/136, 138, 345/431, 434, 419, 589, 581, 593; 358/1.4; 382/199

(56) References Cited

U.S. PATENT DOCUMENTS

| | | | | |
|---|---|---|---|---|
| 5,295,236 A | * | 3/1994 | Bjorge et al. ................ | 345/434 |
| 5,313,570 A | * | 5/1994 | Dermer et al. ............... | 345/431 |
| 5,542,052 A | * | 7/1996 | Deutsch et al. .............. | 345/431 |
| 5,668,931 A | * | 9/1997 | Dermer ........................ | 358/1.4 |
| 6,031,544 A | * | 2/2000 | Yhann .......................... | 345/434 |
| 6,236,754 B1 | * | 5/2001 | Harrington ................... | 382/199 |

OTHER PUBLICATIONS

"The Complete Guide to Trapping," (2nd Ed.), Brian P. Lawler, 1995 Hayden Books.

* cited by examiner

Primary Examiner—Matthew Luu
(74) Attorney, Agent, or Firm—Fish & Richardson P.C.

(57) ABSTRACT

Methods and apparatus implementing a technique for forming a trap polygon which does not interfere with the print quality of other trap polygons or objects. Edges in close proximity to a color transition edge ("CTE") are checked for potential interference. A trap polygon is formed for the CTE that avoids any interfering edges or trap polygons for those edges. The technique can be applied to form a trap polygon for each edge in a page to be printed. In general, in one aspect, forming a trap polygon for trapping a color transition edge, where the trap polygon has an associated trap color determined by colors defining the color transition edge, includes: identifying one or more potentially interfering edges which intersect a keep away zone defined by the color transition edge; screening the potentially interfering edges to identify interfering edges which are part of an object which is of a significantly different color than the trap color; and forming a trap polygon for trapping the color transition edge including shaping the trap polygon to avoid overlapping objects and any trap polygons corresponding to any interfering edges.

32 Claims, 9 Drawing Sheets

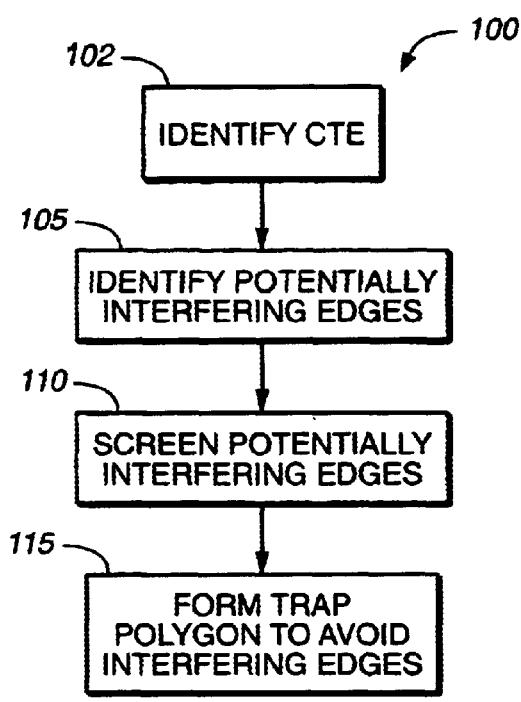
FIG._1
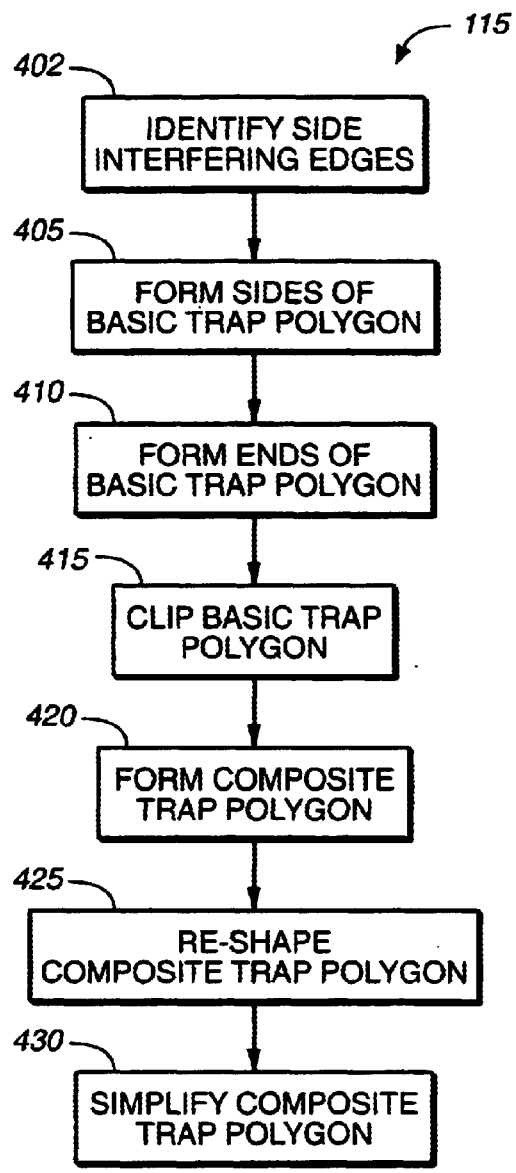
FIG._4
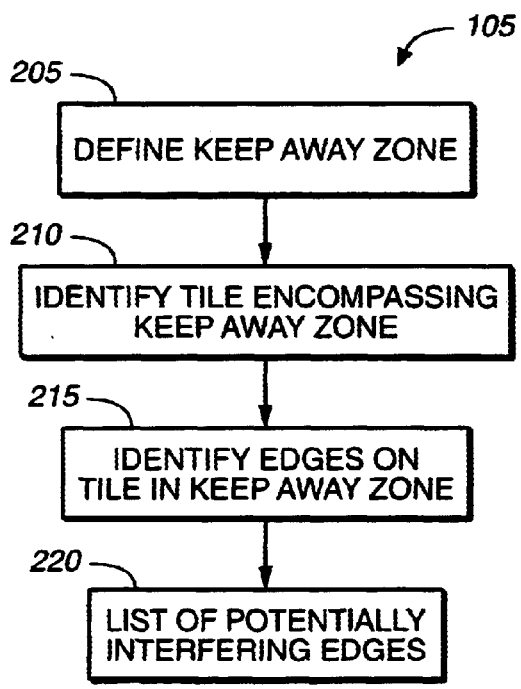
FIG._2

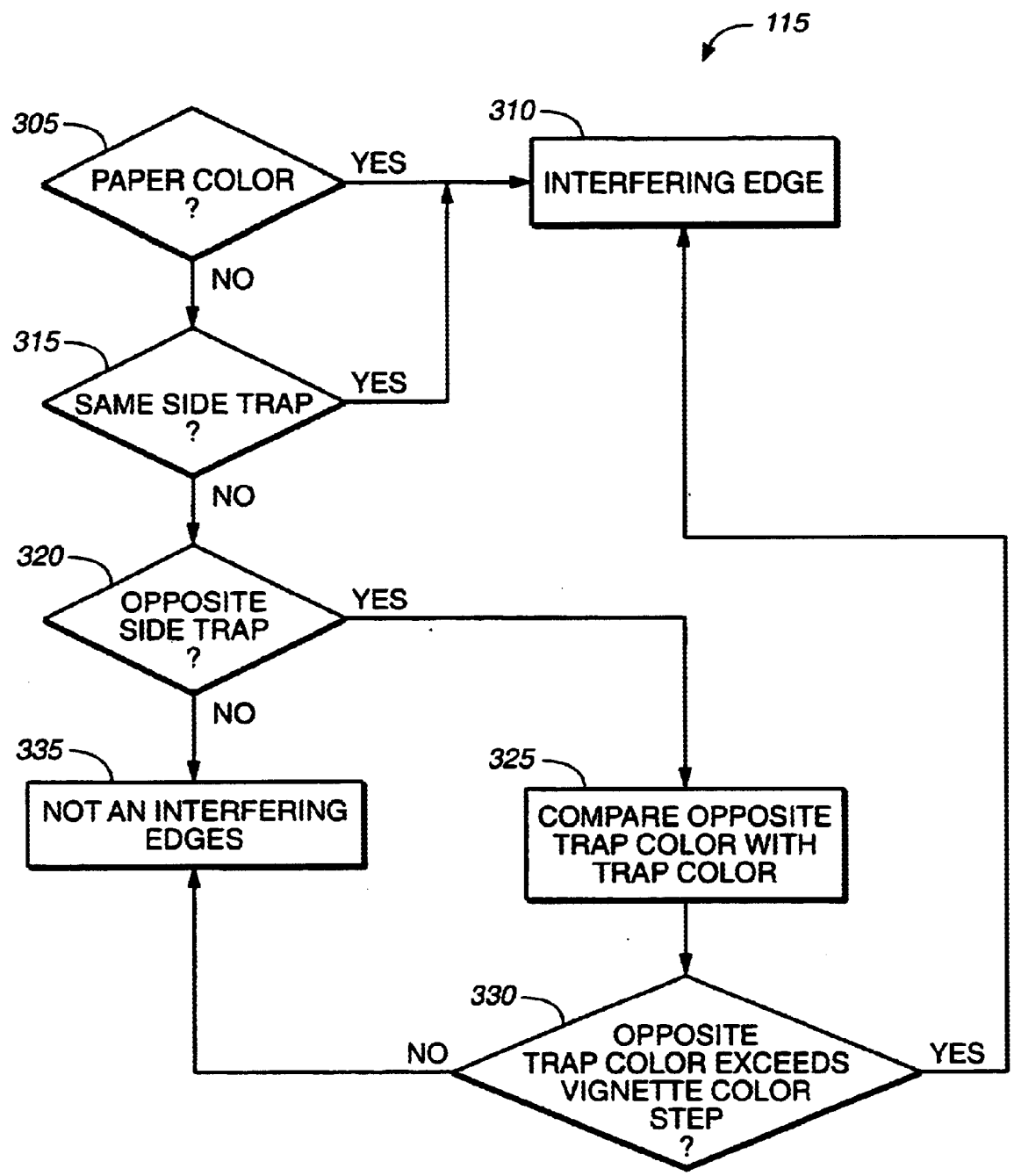
FIG._3

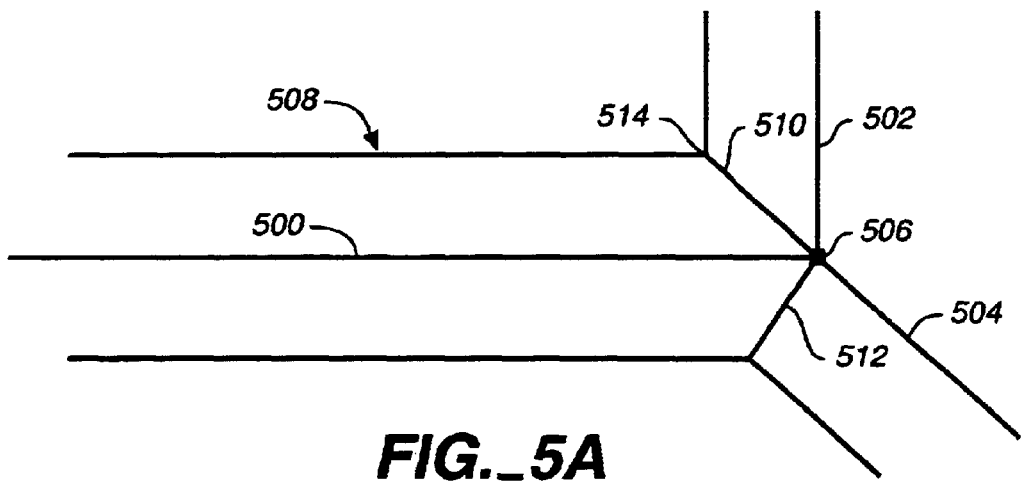
*FIG._5A*
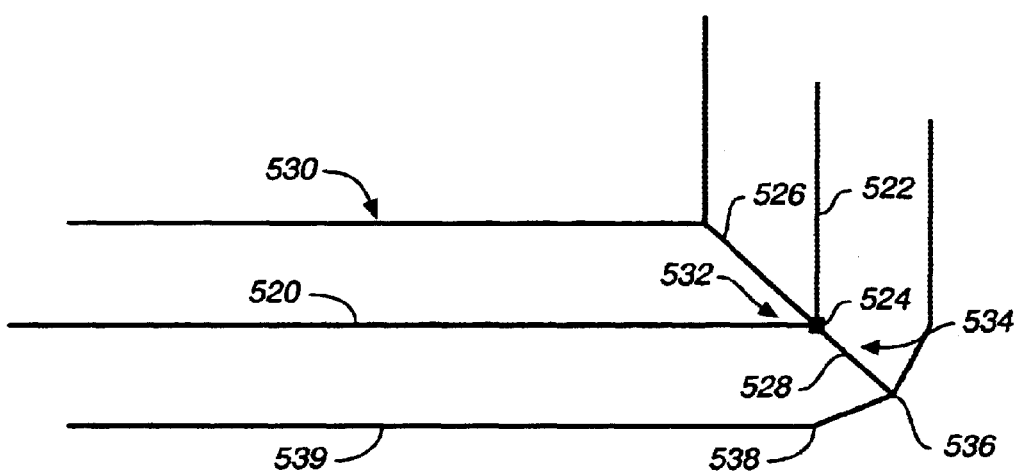
*FIG._5B*
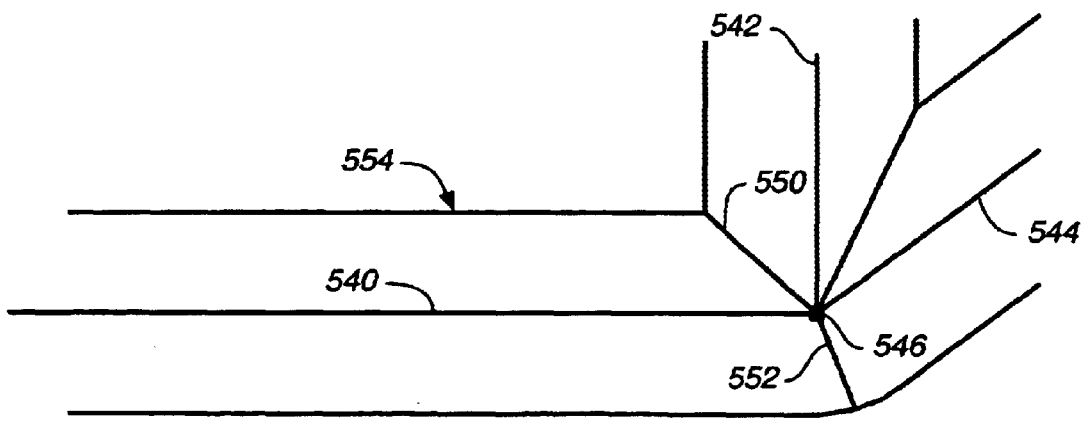
*FIG._5C*

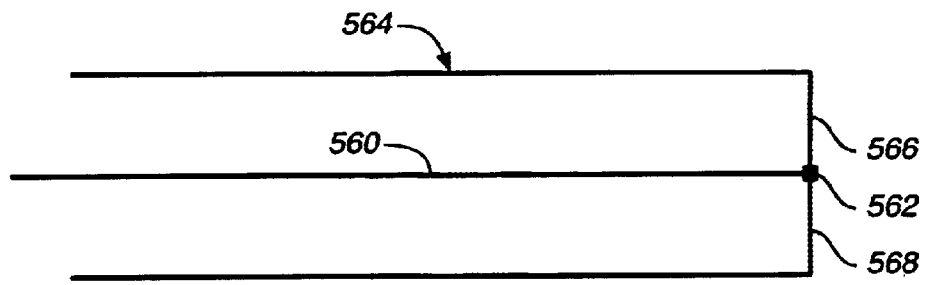
FIG._5D
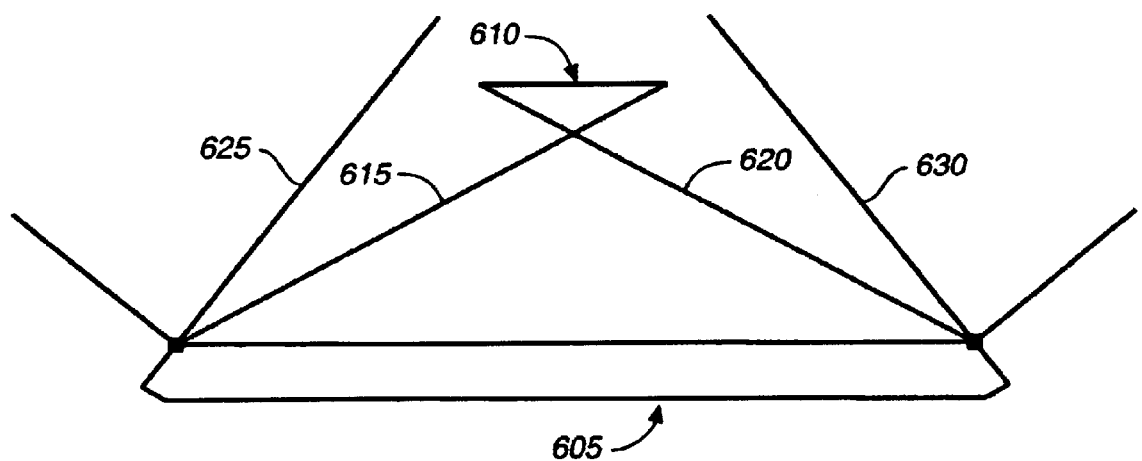
FIG._6A
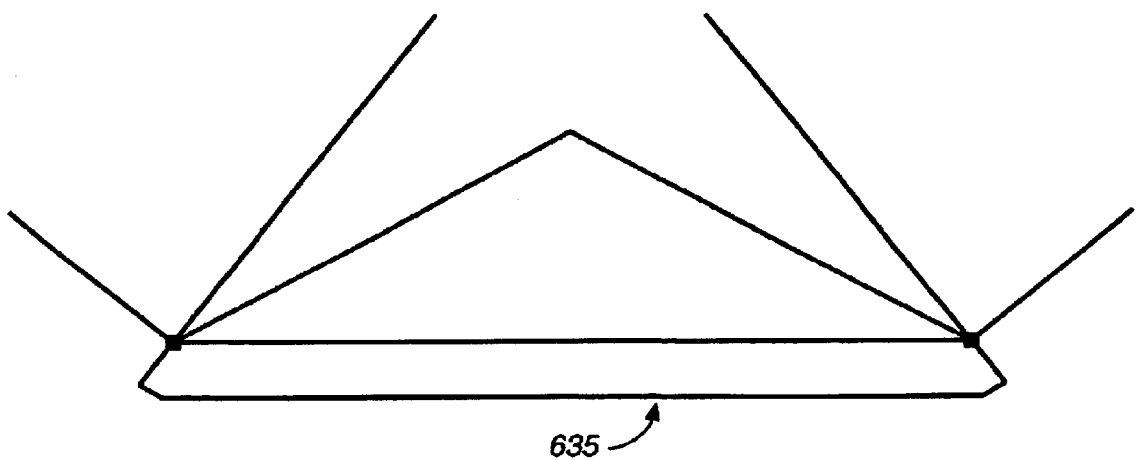
FIG._6B

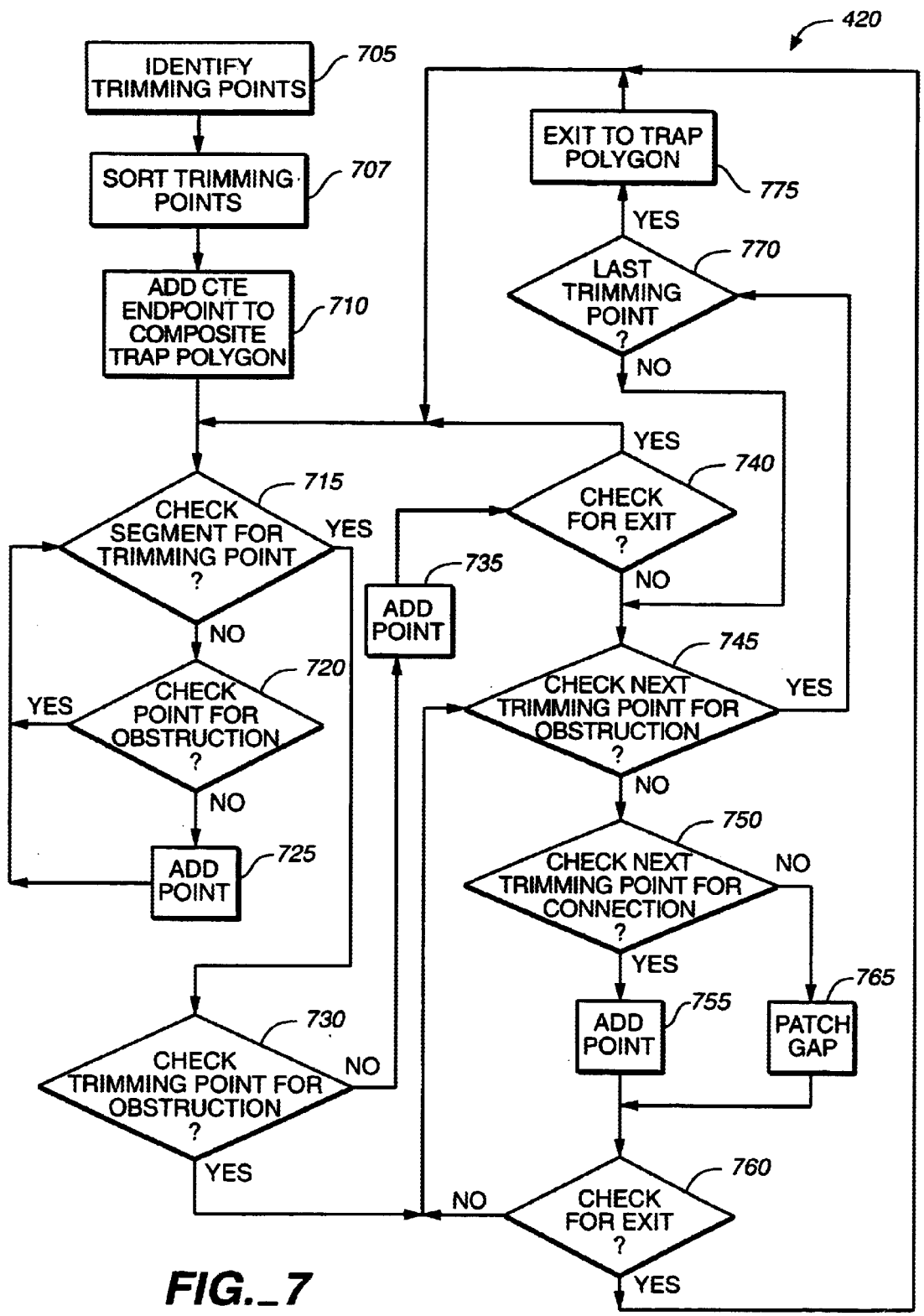
FIG._7

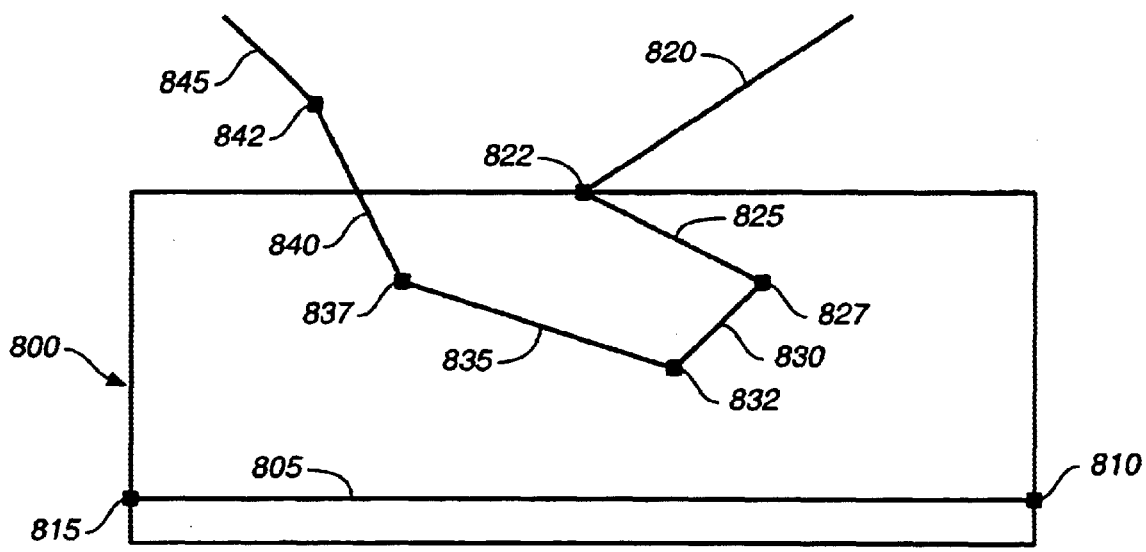
FIG._8A
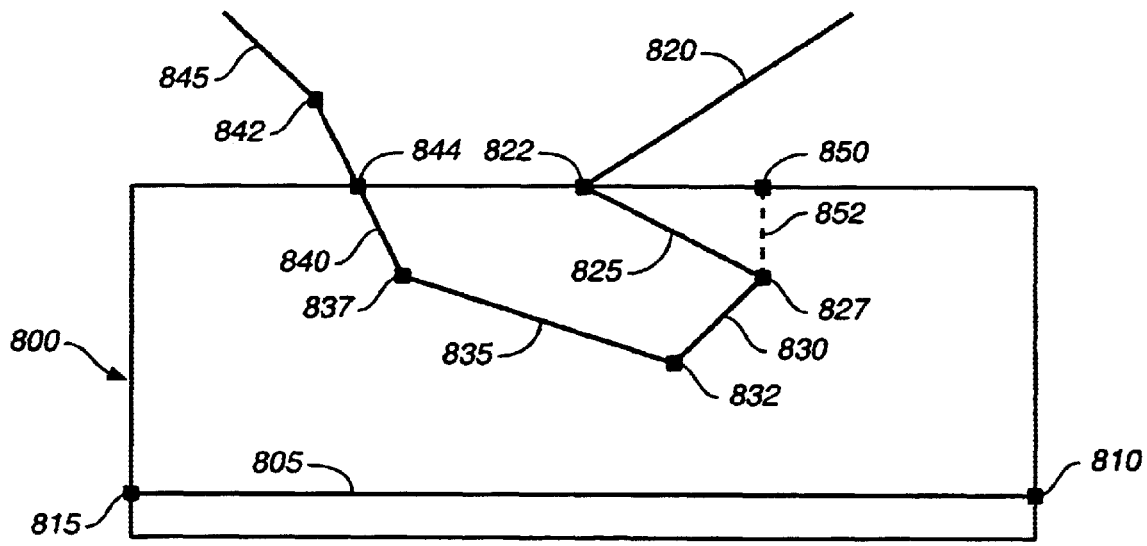
FIG._8B

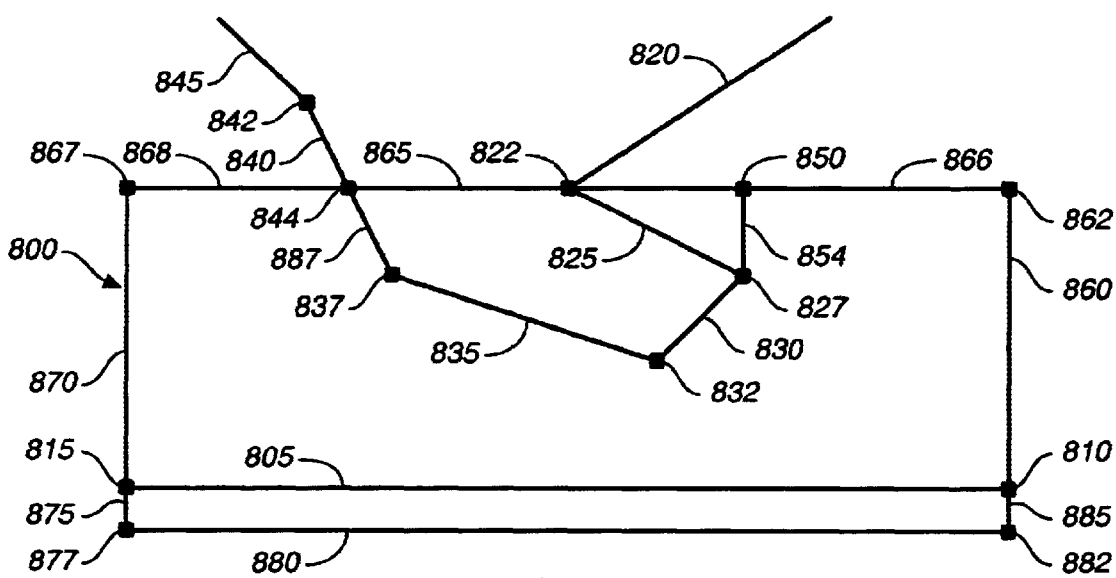
FIG._8C
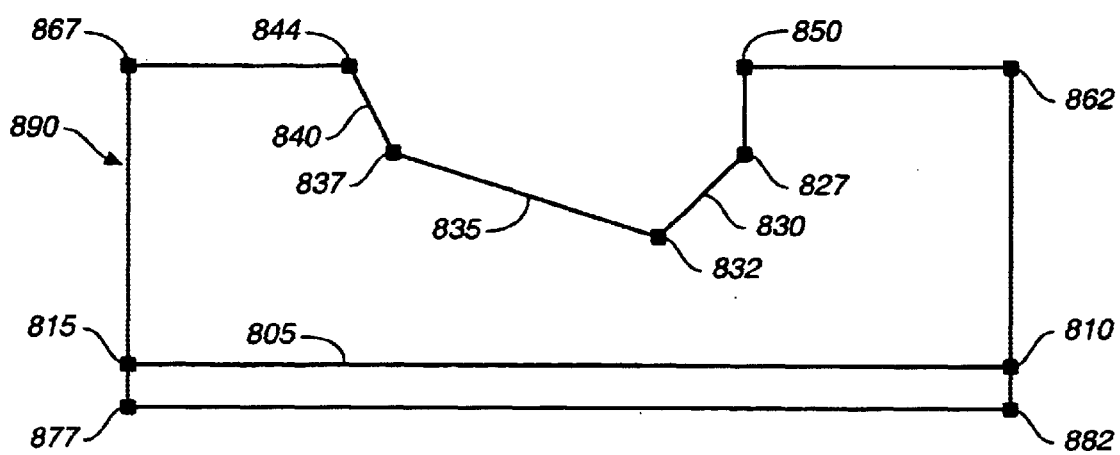
FIG._8D

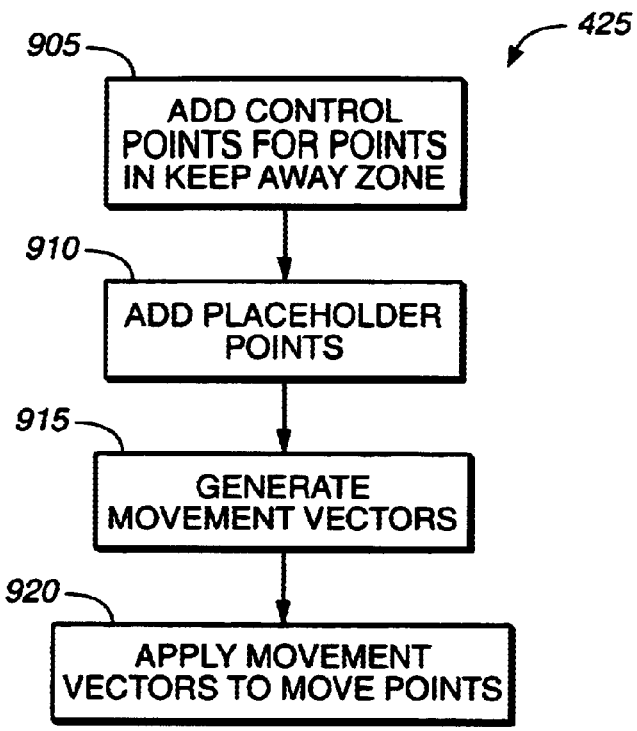
FIG._9
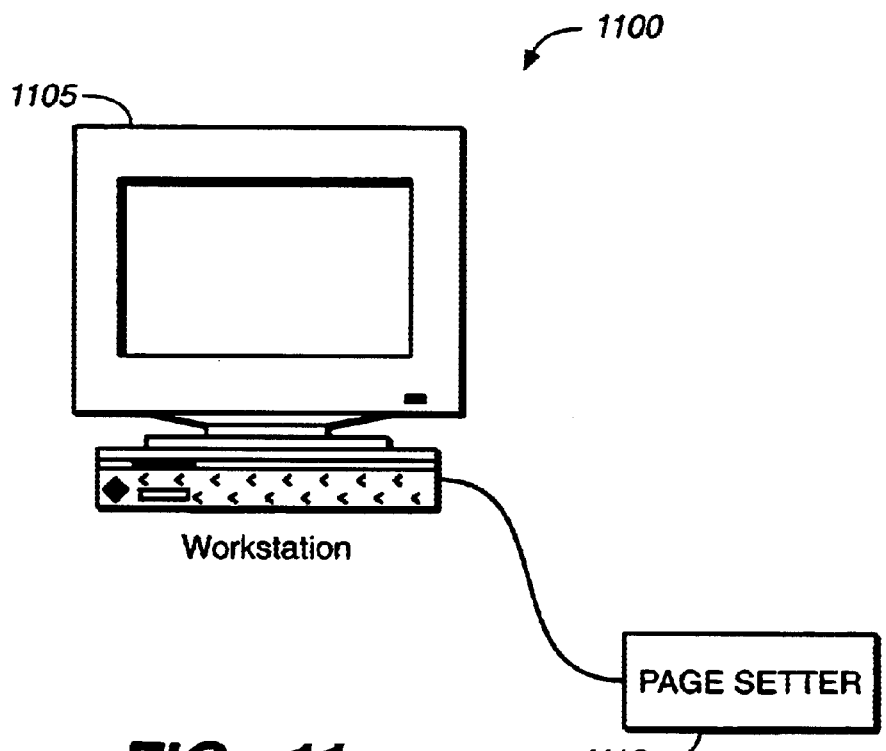
FIG._11

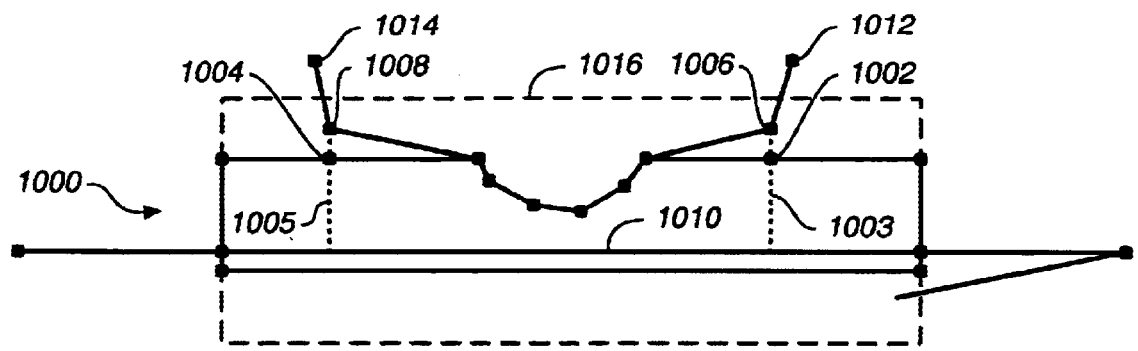
FIG._10A
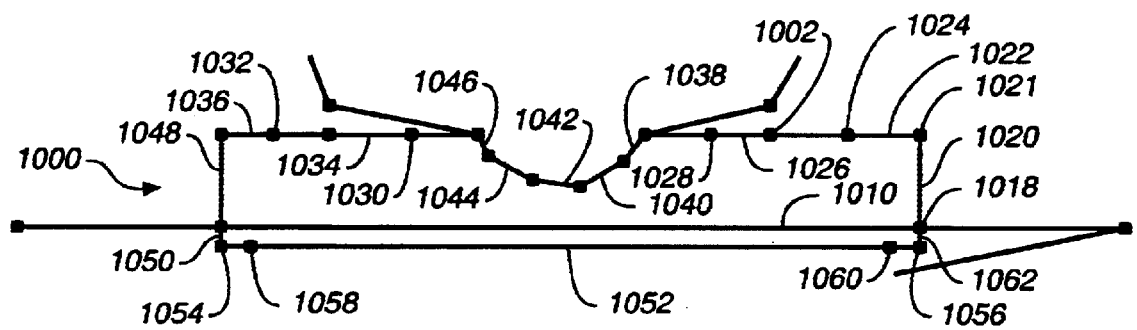
FIG._10B
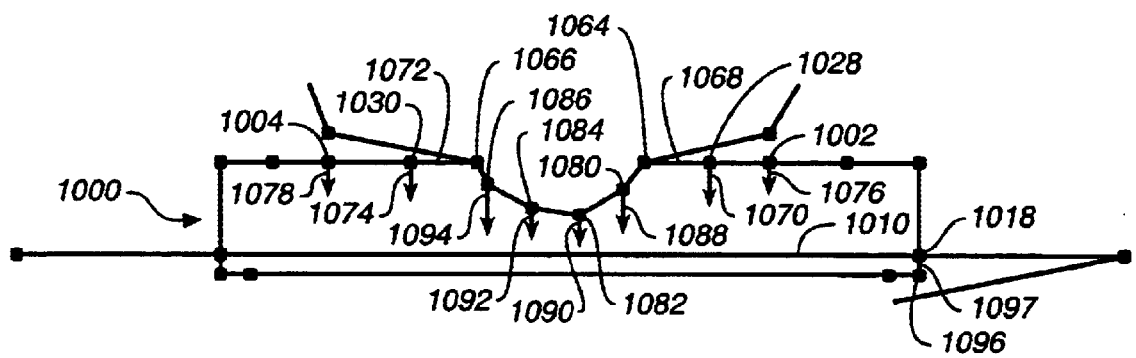
FIG._10C
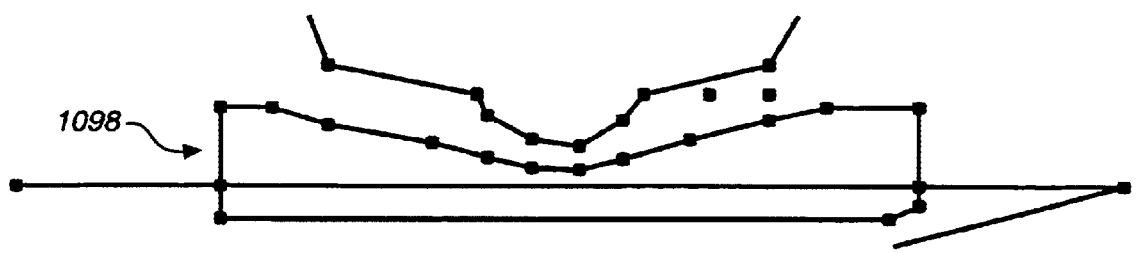
FIG._10D

TRAP SHAPING

BACKGROUND

The invention relates generally to methods and apparatus for forming polygons for use in trapping in digital document preparation or prepress operations.

A page in an electronic document may include various types of objects, including text, line art, and images. Electronic documents are generally created by computer programs (also called application programs or simply applications) that may be executed by a user on a computer to create and edit electronic documents and to produce (directly or indirectly) printed output defined by the documents. Such programs include the Adobe Illustrator® and Photoshop® products, both available from Adobe Systems Incorporated of San Jose, Calif. Objects in electronic documents may be represented in vector form, raster form, or in hybrid forms.

A color page in an electronic document includes information about the colors used in the page. Colors are defined in accordance with a "color space", which provides a data representation of a range of colors in terms of basic color components. The specific color components will vary depending on the color system used. For example, in the CMYK color system, colors are represented as combinations of cyan (C), magenta (M), yellow (Y), and black (or "key") (K).

To create a physical page printed with inks, data representations of colors are used to create color separations. This is generally done by computer programs running on general or special purpose systems. Generally, each color separation used by an output device will correspond to a color component of the color system used by the device. For example, data representations of colors in output generated for an imagesetter using a CMYK color system will be used to create color separations for cyan, magenta, yellow, and black, with each separation indicating regions where the corresponding ink should be applied, as well as the amount of ink that should be applied.

Misregistration or inaccuracies in the physical placement of two or more colors with respect to each other on a printed sheet in printing can cause unintentional gaps or overlaps at edges of color regions on an output page. Misregistration may occur for a variety of reasons relating to the performance of people, machines, and materials.

To minimize the effects of misregistration, a technique known as trapping adjusts the shapes of color regions by spreading (expanding) some color regions to prevent gaps, and choking (contracting) other color regions to prevent overlaps. In determining whether an edge of a shape requires a trap, trapping entails evaluating one or more trap conditions, such as a maximum color difference. Trapping also considers a trap width, defining a general distance around an edge where trapping conditions apply. The adjusted areas into which inks will be spread or from which inks will be contracted are referred to as "trap regions" and defined by a trap polygon. Trapping also entails determination of the amount of ink to be applied to the trap regions for each affected separation. Thus, each trap region has a trap color defining a color for the trap polygon.

When multiple objects form edges that are in close proximity, a trap polygon generated by conventional trapping operations for one or more of these objects can overlap another trap polygon or an object. This overlap may create undesirable printing effects and the trap polygons may no longer be invisible, defeating the original purpose of the trapping operation.

SUMMARY

The invention provides methods and apparatus implementing a technique for forming a trap polygon which does not interfere with the print quality of other trap polygons or objects. Edges in close proximity to a color transition edge ("CTE") are checked for potential interference. A trap polygon is formed for the CTE that avoids any interfering edges or trap polygons for those edges. The technique can be applied to form a trap polygon for each edge in a page to be printed.

In general, in one aspect, forming a trap polygon for trapping a color transition edge, where the trap polygon has an associated trap color determined by colors defining the color transition edge, includes: identifying one or more potentially interfering edges which intersect a keep away zone defined by the color transition edge; screening the potentially interfering edges to identify interfering edges which are part of an object which is of a significantly different color than the trap color; and forming a trap polygon for trapping the color transition edge including shaping the trap polygon to avoid overlapping objects and any trap polygons corresponding to any interfering edges.

The invention provides one or more of the following advantages. Overlapping trap polygons are avoided improving print quality. Similarly, trap polygons can be generated that do not overlap other graphical objects in a page. Portions of a trap polygon which do not aid in trapping are removed while shaping the trap polygon. Trapping can be performed with large trap widths improving print quality for applications such as printing on a medium other than paper. The invention also provides a smooth transition between abutting trap polygons.

BRIEF DESCRIPTION OF THE DRAWINGS

FIG. 1 is a flowchart for forming a trap polygon around a color transition edge according to the invention.

FIG. 2 is a flowchart for identifying potentially interfering edges.

FIG. 3 is a flowchart for screening the list of potentially interfering edges to determine edges which can influence the shape of a trap polygon.

FIG. 4 is a flowchart for forming a trap polygon.

FIGS. 5A–5D show a plurality of trap polygon sides.

FIGS. 6A and 6B show an example of a clipped trap polygon.

FIG. 7 is a flowchart for shaping a trap polygon.

FIGS. 8A–8D illustrate an example of applying the steps of the process of FIG. 7 to a trap polygon.

FIG. 9 is a flowchart for contracting a trap polygon.

FIGS. 10A–10D illustrate an example of applying the steps of the process of FIG. 9 to a trap polygon.

FIG. 11 shows a computer system including a computer connected to a printer.

DETAILED DESCRIPTION

FIG. 1 is a flowchart describing a technique for forming a trap polygon around a color transition edge ("CTE"). The technique can be executed as a process on a processor which can be located in a computer system or a printer. The system performs the steps described below to form a definition of the desired trap polygon as a preprocessing step before printing or rendering a page including multiple graphical objects. The process can be applied to each edge in an electronic document.

The system shapes the trap polygon to avoid overlaps with interfering edges and other trap polygons. Edges are the boundaries of graphical objects. The CTE is an edge bisecting two color regions which presents a risk of misregistration or other printing problem. The CTE and trap polygon are defined in a vector space as points connected by segments. All of the operations of the process can be performed in vector space. Each edge is defined by two points. The trap polygon includes at least three points. Segments of the trap polygon which share an endpoint with the CTE are referred to as "sides" of the trap polygon. The remaining segments of the trap polygon are part of either end. The trap polygon also includes an associated trap color that is determined by the colors on either side of the CTE.

The system identifies a trappable edge or CTE (step 102). A CTE is an edge that satisfies a trap condition, such as exceeding a certain color difference between the colors defined on either side of the CTE. The system can use a conventional method to identify CTEs. Thus, the system generates a trap polygon for each CTE satisfying a trap condition and then shapes that trap polygon, as described below. Alternatively, the process can be adapted to shape a trap polygon separately generated by a conventional method. Identifying the CTE includes identifying a trap color for the CTE. The trap color "spreads" the darker of the two colors on either side of the CTE into the lighter color. For example, if the color on one side of a CTE is 10% cyan, 20% magenta, 30% yellow, and 40% black, and the color on the other side is 40% cyan, 30% magenta, 20% yellow, and 10% black, the trap color is 40% cyan, 30% magenta, 30% yellow, and 40% black.

The system identifies edges which are potentially interfering edges (step 105). Potentially interfering edges can be color transition edges for different graphical objects or other edges in the same object as the CTE. Potentially interfering edges intersect an interference or "keep away" zone defined by the CTE, described below. The system screens the identified potentially interfering edges for interfering edges which present a significant risk of interference (step 110). Interfering edges are edges of objects that are a significantly different color than the trap color of the trap polygon.

The system forms the trap polygon to avoid any interfering edges using a base trap width (step 115). The base trap width can be user-selectable or predetermined. The base trap width defines the distance the trap polygon will extend away from the CTE. Thus, the trap polygon is generally as wide as the base trap width.

The trap polygon is positioned over a darker of the two colors on either side of the CTE so that one edge of the trap polygon coincides with the CTE. The darker color can be identified in a conventional manner. The trap polygon is then extended to overlap the lighter color by a predetermined amount, such as a third of a pixel. The system records the distance from the CTE the trap polygon extends on each side as a respective trap width for that side. The trap width for the side of the CTE having the darker color is the base trap width. The trap width for the side of the CTE having the lighter color is the width of the overlap.

FIG. 2 is a flowchart for identifying potentially interfering edges (step 105 in FIG. 1). The system defines a keep away zone which surrounds the CTE (step 205). The keep away zone is a rectangular area which coincides with the end points of the CTE and extends perpendicular from the CTE a certain distance, such as the base trap width or a multiple of the base trap width. The keep away zone can extend a different distance from each side of the CTE, such as a distance based on the trap width for the respective side of the CTE.

The logical page including the CTE can be divided into tiles. Each tile has an edge table including a list of edges which touch or intersect the tile. Each tile can be divided into a hierarchy of sub-tiles. At the topmost level is the tile itself. At a next level, four sub-tiles each include one-fourth of the tile, and so on. The hierarchy can include multiple levels for increasing resolution, such as seven levels. Each sub-tile includes a list of references to edges which touch or intersect the sub-tile. The references refer to edges in the edge table corresponding to the tile which contains the sub-tile. A reference to an edge which extends across several sub-tiles is included in each of the lists of edges for the sub-tiles. An intersection of edges creates an endpoint, dividing the edges in the edge table for the tile. For example, in a tile where two edges cross, the edge table includes four edges sharing the point of intersection as an endpoint.

The system evaluates the keep away zone to find the smallest tile or sub-tile which completely encompasses the keep away zone (step 210). The system compares each of the edges in the list of edges for that sub-tile or tile for intersection with the keep away zone (step 215). An edge intersects the keep away zone if the edge touches any part of the keep away zone. For example, the segment defined by endpoints of the edge touches an edge of the keep away zone. An edge which coincides with the CTE at an endpoint also intersects the keep away zone. The system stores the intersecting edges in a list of potentially interfering edges (step 220).

FIG. 3 is a flowchart for screening the list of potentially interfering edges to determine interfering edges which present sufficient risk to influence the shape of a resultant trap polygon (step 110 in FIG. 1). For each candidate edge in the list, the system identifies which candidate edges are adjacent to a color which is significantly different from those of the CTE. The system uses the colors on either side of the candidate edge and the colors on either side of the CTE to screen the candidate edges. The system stores the resulting interfering edges in a list of interfering edges.

If the color on either side of the candidate edge is "paper" color (i.e., an area with no printing or a color having the same color as that defined for the paper) (step 305), the system adds the candidate edge to the list of interfering edges (step 310).

The system compares the color on each side of the candidate edge and the color on the same side of the CTE as the candidate edge (step 315). If either combination would satisfy a trap condition if the colors were adjacent (i.e., forming a CTE), the system adds the candidate edge to the list of interfering edges (step 310).

If a trap condition is not satisfied in step 315, the system compares the color on each side of the candidate edge and the color on the opposite side of the CTE from the candidate edge (step 320). If either combination would satisfy a trap condition, the system compares a hypothetical trap color of that hypothetical color transition to the trap color of the trap polygon for the CTE to determine a trap color difference (step 325). The trap color difference can be expressed as a percentage difference between each of the colorant planes of the trap colors. For example, if the hypothetical trap color is 80% cyan, 25% magenta, 60% yellow, and 10% black, and the trap color of the trap polygon for the CTE is 70% cyan, 23% magenta, 59% yellow, and 12% black, then trap color difference is then 10% for cyan (i.e., 80%−70%=10%), 2% for magenta, 1% for yellow, and 2% for black.

The system compares the trap color difference to a vignette color transition (step 330). A vignette color transition is a measure of the amount of difference between two colors, such as 5%. In the example above, if the vignette color transition is 5%, the trap color difference would exceed the vignette color transition because the difference for cyan is defined as 10%. Vignette colors are described in U.S. patent application Ser. No. 09/127,548, assigned to the assignee of the present application, the disclosure of which is incorporated herein by reference. In one implementation, when comparing the trap color difference to the vignette color transition, the system ignores any colorant planes of the trap color which would overprint. A colorant plane of the trap color that has a value that is the same as a corresponding value in the darker of the CTE colors results in an overprint condition where that colorant plane would not be marked in printing. Thus, in the above example, if cyan would overprint because the darker CTE color has a value of 70% for cyan (i.e., a colorant plane of the darker CTE color is the same as the corresponding colorant plane of the trap color), the system ignores the cyan value in the comparison of step 330.

If the difference between the hypothetical trap color and the trap color of the trap polygon exceeds the vignette color transition, the system adds the candidate edge to the list of interfering edges (step 310).

If none of the above conditions are satisfied, the system does not add the candidate edge to the list of interfering edges (step 335). The system applies this screening to each candidate edge.

FIG. 4 is a flowchart for forming a trap polygon (step 115 in FIG. 1). The trap polygon includes a plurality of points and segments connecting consecutive points so that each point has two segments which have that point as an endpoint. The trap polygon includes a point for each endpoint of the CTE. As the system adds points to the trap polygon, the system records a type for the point (i.e., why the point was added). As noted above, the segments of the trap polygon which share an endpoint with the CTE are sides of the trap polygon.

The system identifies side interfering edges which are close enough to an endpoint of the CTE to influence the shape of a side of the trap polygon for the CTE (step 402). If the CTE is shorter than a predetermined length, such as one pixel, the system identifies interfering edges which have an endpoint that coincides with an endpoint of the CTE as side interfering edges. Otherwise, the system identifies interfering edges which have an endpoint within a predetermined distance, such as half a pixel, of an endpoint of the CTE as side interfering edges. This predetermined distance and length can be user-selectable values.

The system forms sides of a basic trap polygon according to the trap width and the identified side interfering edges, as described below (step 405). The system forms the sides so that when a neighboring trap polygon is formed and adjusted, the corresponding side of that neighboring trap polygon will coincide with the appropriate side of the current trap polygon. After forming the sides, the system forms the ends of basic trap polygon, such as by recording segments connecting the endpoints of the sides (step 410). FIGS. 5A–5D, described below, show examples of sides of trap polygons.

The system forms the sides of the basic trap polygon to avoid any identified side interfering edges. An interfering edge which has colors within a vignette color transition does not affect the formation of the sides. If the system does not identify any side interfering edges, the system forms sides which are equal in length to the corresponding trap width and form right angles with the CTE at the corresponding endpoint.

If more than two side interfering edges correspond to an endpoint of the CTE, the system uses two of those side interfering edges to form the sides at that endpoint of the CTE. In one implementation, the system uses the two side interfering edges which form the smallest angle with each side of the CTE, respectively. For example, if the CTE shares an endpoint with three interfering edges, the interfering edge between the other two interfering edges is not used in forming the sides of the trap polygon.

To form a side between an endpoint of the CTE and a side interfering edge, the system places a point at a certain distance from the endpoint of the CTE so that the segment defined by that point and the endpoint of the CTE defines an angle equal to half a difference angle between the CTE and the side interfering edge. The difference angle is an angle between the CTE and the side interfering edge measured in a direction from the CTE to the side being constructed. If the difference angle is equal to or less than approximately 180 degrees, the system places a point at a distance determined according to the difference angle, such as equal to the corresponding trap width multiplied by the cosecant of one half of the difference angle. The distance between the point and the closest point on the CTE is the corresponding trap width.

However, if the angle between the CTE and the side interfering edge is less than approximately 90 degrees and the length of the side interfering edge is less than the trap width for the corresponding side of the CTE, the system can ignore the side interfering edge. The system forms the side for the basic trap polygon by placing a point at a distance equal to the trap width from the CTE and so that side forms a right angle with the CTE. The system accounts for the side interfering edge by trimming the side to avoid the side interfering edge, as described below.

If the difference angle is greater than approximately 180 degrees, the system places a first point at a distance equal to the trap width from the endpoint of the CTE. The system also places a second point at a distance equal to the corresponding trap width from the CTE so that a segment from the second point to the endpoint of the CTE would form a right angle with the CTE. The side extends from the endpoint of the CTE to the first point and the system adds an additional segment to the basic trap polygon from the first point to the second point.

In FIG. 5A, a CTE 500 and two interfering edges 502 and 504 share an endpoint 506. Interfering edges 502 and 504 are side interfering edges because interfering edges 502 and 504 share endpoint 506 with CTE 500. A trap polygon 508 has two sides 510 and 512 which share endpoint 506. Side 510 is at the center of an angle between CTE 500 and interfering edge 502. Side 512 is at the center of the angle between CTE 500 and interfering edge 504. Because the difference angle between interfering edge 502 and CTE 500 is less than 180 degrees, the distance between endpoint 506 of CTE 500 and endpoint 514 of side 510 can be equal to the corresponding trap width times the cosecant of one-half the difference angle between CTE 500 and interfering edge 502. The distance between point 514 and CTE 500 is equal to the corresponding trap width.

In FIG. 5B, a CTE 520 and an interfering edge 522 share an endpoint 524, as well as two sides 526 and 528 of a trap polygon 530 formed for the CTE 520. Side 526 is at the center of a first angle 532 between CTE 520 and interfering edge 522, measured clockwise. A second angle 534 between side 522 and CTE 520, measured counter-clockwise, is greater than 180 degrees. A first point 536 at the center of second angle 534 defines side 528 with endpoint 524. A second point 538 connects side 528 to an end 539 of trap polygon 530. Points 536 and 538 are at a distance equal to the corresponding trap width from endpoint 524.

In FIG. 5C, similar to FIG. 5A, a CTE 540 and two interfering edges 542 and 544 share an endpoint 546. Similar to the sides in FIGS. 5A and 5B, two sides 550 and 552 of a trap polygon 554 are formed for CTE 540 and split angles between CTE 540 and corresponding interfering edges 542 and 544, respectively.

FIG. 5D shows a CTE 560 which does not share an endpoint 562 with any interfering edges. A trap polygon 564 for CTE 560 is rectangular and sides 566 and 568 of the trap polygon 564 are perpendicular to CTE 560.

After forming the sides and ends defining the basic trap polygon in steps 405 and 410, the system clips any self-intersecting sections from the basic trap polygon (step 415). That is, the system clips portions of the trap polygon as appropriate so that the basic trap polygon is a single enclosed polygon encompassing the CTE without overlapping sides. FIGS. 6A and 6B show an example of the application of the clipping step to a trap polygon. In FIG. 6A, a trap polygon 605 includes an isolated "bow tie" portion 610. The system created the bow tie portion 610 when forming sides 615 and 620 of trap polygon 605 because of interfering edges 625 and 630, as described above. In FIG. 6B, the system has clipped bow tie portion 610 forming a single enclosed trap polygon 635 which is not self-intersecting.

After clipping any closed sections, the system forms a composite trap polygon by trimming the basic trap polygon (step 420). The system trims sections of the trap polygon which intersect with interfering edges, as described below. The system re-shapes the composite trap polygon to avoid interfering edges and trap polygons corresponding to those interfering edges (step 425). To re-shape the composite trap polygon, the system adds points to the composite trap polygon, recording the condition causing each point to be added (i.e., the type of each point) for reference in re-shaping. The system contracts the composite trap polygon by moving the points of the composite trap polygon according to the types of the points, as described below. The system optionally simplifies the contracted polygon by removing any adjacent colinear points in the composite trap polygon (step 430). The system removes a point which is colinear with the endpoints of segments which share the point as an endpoint.

FIG. 7 is a flowchart for trimming the trap polygon (step 420 in FIG. 4). FIGS. 8A–8D illustrate an example of applying the steps of FIG. 7 to a trap polygon 800. Before trimming the trap polygon, the system can transform the trap polygon into a different coordinate space for efficient computation.

The system identifies trimming points which are in or on the basic trap polygon (step 705). Trimming points include endpoints of interfering edges where the endpoints are within or intersect the trap polygon. FIG. 8A shows a trap polygon 800 for a CTE 805 with endpoints 810 and 815. Interfering edges 820, 825, 830, 835, and 840 intersect or are within trap polygon 800. Interfering edge 845 does not intersect trap polygon 800. Accordingly, the system identifies point 822 as a trimming point because point 822 is on trap polygon 800. The system identifies points 827, 832, and 837 as trimming points because these points 827, 832, 837 are endpoints which are within trap polygon 800. Point 842 is not a trimming point because point 842 is outside trap polygon 800.

The system also identifies trimming points for certain points which are not endpoints of interfering edges. Points where an interfering edge intersects a segment or point of the basic trap polygon are trimming points. Points which correspond to an enclosed endpoint of an interfering edge are trimming points. An enclosed endpoint falls within the trap polygon and has an unobstructed path perpendicular and away from the CTE from the point to a segment of the basic trap polygon. An enclosed endpoint also is not an endpoint for an interfering edge which has another endpoint horizontally closer to the endpoint of the CTE which is horizontally closer to the enclosed endpoint (where horizontal is parallel to the CTE). The system also records a segment from the added trimming point to the enclosed endpoint.

FIG. 8B shows additional trimming points which are not endpoints of interfering edges. The system identifies point 844 as a trimming point because point 844 is where interfering edge 840 intersects trap polygon 800. As noted above, the edge table for a tile includes a list of all points where edges intersect (i.e., if two edges cross, the edge table includes four edges sharing the intersection point as an endpoint), but does not include points for intersections of edges with the trap polygon because the trap polygon is formed after the edge table. The system identifies point 850 as a trimming point because point 827 is an enclosed endpoint. A dashed line 852 represents an unobstructed path from point 827 to trap polygon 800, perpendicular and away from CTE 805. In addition, point 827 is an endpoint for interfering edges 825 and 830. The other endpoints of interfering edges 825 and 830 are points 822 and 832, respectively. Point 827 is closer to endpoint 810 of CTE 805 than to endpoint 815 and point 827 is closer to endpoint 810 than either point 822 or 832. By contrast, point 837 is not horizontally closer to endpoint 815 than point 842 and so is not an enclosed endpoint.

The system sorts the identified trimming points according to horizontal distance from an endpoint of the CTE and vertical distance from the CTE (step 707). The origin for horizontal distance is the endpoint of the CTE added in step 710, as described below.

After sorting the trimming points, the system begins to form a composite trap polygon by adding a CTE endpoint to the composite trap polygon (step 710). The system can start with either endpoint of the CTE and add points by proceeding around the basic trap polygon, such as in a counter-clockwise fashion from the starting endpoint. The trimming ends when the system returns to the starting endpoint. FIG. 8C shows the trap polygon 800 including points 810, 862, 867, 815, 877, and 882 and with trimming points 850, 822, 827, 832, 837, 844. FIG. 8C also shows segment 854 added for trimming point 850 and enclosed endpoint 827. The system defines point 810 as the starting endpoint, adds point 810 to a composite polygon definition, and will proceed to point 862 and so on, as described below.

The system checks the segment of the basic trap polygon from the current point, initially the starting endpoint of the CTE, to the next point along the basic trap polygon for any trimming points (step 715). In FIG. 8C, the system checks segment 860 between point 810 and point 862.

If the segment does not include a trimming point, the system checks whether the endpoint of the segment has an unobstructed path to the CTE (step 720). The system forms a straight path from the endpoint to the nearest point on the CTE. A path is obstructed if the path intersects an interfering edge on the same side of the CTE as the endpoint, or intersects a segment of the composite trap polygon as it is sequentially constructed. The system can accept a path which is colinear with or intersects only the endpoint of an edge or segment as being unobstructed. In FIG. 8C, segment 860 does not have any trimming points so the system checks point 862 for an unobstructed path. Point 862 has an unobstructed path to the nearest point on CTE 805, endpoint 810, because there are no intervening edges. By contrast, point 822 does not have an unobstructed path to CTE 805 due to interfering edge 835.

If the point has an unobstructed path, the system adds the point to the composite trap polygon (step 725). The system also records the type of the added point (e.g., that the point is a point from the basic trap polygon or a trimming point added for an enclosed point). The system adds a segment between the point and the last point added to the composite trap polygon. The system continues the process at step 715. In FIG. 8C, point 862 has an unobstructed path, so the system adds point 862 and segment 860 to the composite trap polygon. The system checks segment 865 between point 862 and point 867 for trimming points.

If the point does not have an unobstructed path (from step 720), the system does not add the point to the composite trap polygon and the system continues the process at step 715.

If the segment includes a trimming point (from step 715), the system checks whether the trimming point has an unobstructed path to the CTE (step 730). The system also records having considered the trimming point in this step for reference as described below. In FIG. 8C, when the system checks segment 865, the system finds trimming point 850. The system checks trimming point 850 for an unobstructed path to CTE 805. Because the path is colinear with segment 854, the system accepts the path as unobstructed.

If the trimming point has an unobstructed path, the system adds the trimming point to the composite trap polygon (step 735). The system also records the type of the added point and adds a segment to the composite trap polygon between the trimming point and the last point added to the composite trap polygon. In FIG. 8C, the system adds point 850 to the composite trap polygon and segment 866 between point 850 and point 862. The system records that trimming point 850 was added to the composite trap polygon as a trimming point corresponding to an enclosed endpoint. If the trimming point does not have an unobstructed path, the system continues the process at step 745, described below.

After adding the trimming point, the system checks whether the added trimming point is an exit point (step 740). An exit point is a trimming point which is on the basic trap polygon and an endpoint only for those interfering edges which have another endpoint within the basic trap polygon which the system has already considered in step 730 or step 745, described below. In FIG. 8C, the system checks whether trimming point 850 is an exit point. Trimming point 850 is on the basic trap polygon, but is an endpoint for interfering edge 854 which has trimming point 827 as another endpoint. The system has not considered trimming point 827 in step 730 or step 745 and so trimming point 850 is not an exit point. If the added trimming point is an exit point, the system continues the process at step 715.

If the added trimming point is not an exit point, the system checks whether the next trimming point in the sorted list of trimming points has an unobstructed path to the CTE (step 745). The system also records having considered the trimming point in this step for reference as in step 730. In FIG. 8C, the system retrieves trimming point 827 from the sorted list as the next trimming point and checks whether trimming point 827 has an unobstructed path to CTE 805.

If the next trimming point has an unobstructed path to the CTE, the system checks whether that trimming point is connected to the last added point (step 750). The next trimming point is connected to the last added point if the trimming point and the last added point are endpoints of a single segment, such as an interfering edge (e.g., interfering edge 830) or a segment added between an enclosed endpoint and a corresponding trimming point (e.g., segment 854). In FIG. 8C, trimming point 827 has an unobstructed path to CTE 805 and is connected to trimming point 850 (the endpoints of segments 854).

If the next trimming point is connected to the last added point, the system adds the next trimming point to the composite trap polygon (step 755). The system also records the type of the added point and adds a segment to the composite trap polygon between the trimming point and the last point added to the composite trap polygon. In FIG. 8C, the system adds point 827 to the composite trap polygon and segment 854 between point 827 and point 850. The system records that trimming point 827 was added to the composite trap polygon as a trimming point within the basic trap polygon.

After adding the trimming point, the system checks whether the added trimming point is an exit point (step 760). In FIG. 8C, the system checks whether trimming point 827 is an exit point. Trimming point 827 is not on the basic trap polygon and so trimming point 827 is not an exit point. If the added trimming point is an exit point, the system continues the process at step 715. If the added trimming point is not an exit point, the system finds the next unobstructed trimming point in the sort list (step 745) and the process continues. In FIG. 8C, trimming point 827 is not an exit point and so the system retrieves trimming point 832 as the next trimming point for processing. Later, after the system adds trimming point 844 in step 755, the system identifies trimming point 844 as an exit point and proceeds to step 715. Trimming point 844 is an exit point because trimming point 844 is on the basic trap polygon and the only interfering edge with another endpoint within the basic trap polygon that has trimming point 844 as an endpoint is interfering edge 887, a segment of interfering edge 840.

If the next trimming point with an unobstructed path (from step 745) is not connected to the last added point, the system patches a gap between the two points (step 765). The system evaluates the points and edges near the points to construct a patch including one or more segments with endpoints at the next trimming point and the last added point. In one implementation, the system performs this evaluation using the criteria shown in Table 1.

TABLE 1

Sequence for patching the hole (or gap) between two trimming points where a connection has not been found
close point - last point added to the composite trap polygon
next point - next unobstructed point to be added to the
    composite trap polygon
Test for a feature intersection between the first point and
its perpendicular point on the CTE
    if such a feature exists
        add that intersection point
        done TABLE 1-continued

```
Test for a feature intersection between the first point and
the outside of the basic trap polygon
    record the results as KPC variable
    if such a feature exists AND a link can be established
    between the far point and that feature
        add that intersection point
        done
Test for a feature intersection between the far point and the
outside of the basic trap polygon
    record the results as KPN variable
    if (KPC == TRUE and KPN == TRUE)
        test KPC point for obstruction
            if unobstructed or obstruction is KPC feature
                add KPC intersection point
        test KPN point for obstruction
            if unobstructed or obstruction is KPN feature
                add KPN intersection point
    else if (KPC == TRUE)
        test KPC point for obstruction
            if unobstructed or obstruction is KPC feature
                add KPC intersection point
        form point KPCO slightly past KPC intersection point
        on basic trap polygon segment
            test KPCO point for obstruction
                if unobstructed
                    add KPCO intersection point
        form point KPNO slightly before KPN intersection
        point on basic trap polygon segment
            test KPNO point for obstruction
                if unobstructed
                    add KPNO intersection point
    else if (KPN == TRUE)
        form point KPCO slightly past KPC intersection point
        on basic trap polygon segment
            test KPCO point for obstruction
                if unobstructed
                    add KPCO intersection point
        form point KPNO slightly before KPN intersection
        point on basic trap polygon segment
            test KPNO point for obstruction
                if unobstructed
                    add KPNO intersection point
        test KPN point for obstruction
            if unobstructed or obstruction is KPN feature
                add KPN intersection point
    else if (KPN == FALSE && KPC == FALSE)
    / * no features found at either point so add a segment
    from the basic polygon */
        form point KPCO slightly past KPC intersection point
        on basic trap polygon segment
            test KPCO point for obstruction
                if unobstructed
                    add KPCO intersection point
        form point KPNO slightly before KPN intersection
        point on basic trap polygon segment
            if KPNO segment not consecutive with KPCO
            segment
                test intervening basic trap polygon points
                for obstruction
                    add unobstructed points
            test KPNO point for obstruction
                if unobstructed
                    add KPNO intersection point
```

If the next trimming point does not have an unobstructed path to the CTE (from step 745), the system checks whether the next trimming point is the last trimming point in the sorted list of trimming points (step 770). If the trimming point is not the last trimming point in the sorted list, the system checks whether the next trimming point in the sorted list has an unobstructed path to the CTE (step 745) and the process continues. If the trimming point is the last trimming point in the sorted list, the system constructs a return segment to exit to the basic trap polygon (step 775). To construct this return segment, the system evaluates the points and edges around the last added point as well as the points of the basic trap polygon. In one implementation, the system performs this evaluation using the criteria shown in Table 2.

TABLE 2

```
Trap polygon exit strategy
if (the last point added is outside the Basic Trap Polygon)
    find the segment this point is located on
else
    find the segment that the last two composite polygon
    points would intersect with
    if the intersection point is less than one pixel away
        add the intersection point
        return close intersection segment
    else
        find the closest segment of the basic trap polygon
        with the exception of the entry segment
        find the closest non-shared segment of the basic
        trap polygon
        if shared segment is valid && non-shared segment is
        invalid
            add the shared segment intersection point
            return shared segment
        else if the shared segment is invalid && non-shared
        segment is valid
            add the non-shared segment intersection point
            return non-shared
        else if the shared segment intersection point is
        closer to the last point
            add the shared segment intersection point
            return shared segment
        else
            add the non-shared segment intersection point
            return non-shared segment
create a new segment to test for control points
segment is between last point on composite polygon and end
point of returned segment
```

After returning to a point in the basic trap polygon, the system checks the segment from that point to the next point in the basic trap polygon for a trimming point (step 715) and the process continues.

In FIG. 8C, the system proceeds along the trimming points 832 and 837 within trap polygon 800, adding points to the composite trap polygon with unobstructed paths. The system adds points 832 and 837 and segments 830 and 835 to the composite trap polygon. The system adds trimming point 844 and segment 887 between trimming points 837 and 844. The system does not add the interfering edge 840 because trimming point 844 is an exit point, as described above, and so part of the interfering edge 840 is outside trap polygon 800. The system proceeds along trap polygon 800 and adds points 867, 815, 877, and 882 and segments 868, 870, 875, 880, and 885. FIG. 8D shows the resulting composite trap polygon 890.

FIG. 9 is a flowchart for re-shaping the composite trap polygon formed in step 420 (step 425 in FIG. 4). FIGS. 10A–10D illustrate an example of applying the steps of FIG. 9 to a composite trap polygon 1000.

The system adds control points to the composite trap polygon for endpoints of interfering edges where the endpoints are outside the composite trap polygon and inside the keep away zone (step 905). A control point for an endpoint is added to a segment of the composite trap polygon where a path traced from the endpoint to the nearest point on the CTE intersects the segment. In FIG. 10A, control points 1002 and 1004 are added to composite trap polygon 1000 for endpoints 1006 and 1008, respectively. Dashed lines 1003 and 1005 represent a path traced to a CTE 1010 to position control points 1002 and 1004 on composite trap polygon 1000. Control points are not added for endpoints 1012 and 1014 because these endpoints 1012 and 1014 are outside a keep away zone 1016 for the CTE 1010.

The system adds placeholder points to segments of the composite trap polygon between points of the composite trap polygon, including control points, which are separated by a predetermined distance (step 910). The system does not add place holder points to the sides of the composite trap polygon. The distance from comparison can be based on the trap width for the corresponding side of the CTE. The system compares the length of each segment between points on the composite trap polygon to the appropriate trap width. If the segment has a length greater than the trap width, the system adds a placeholder point to the middle of the segment or at a distance equal to the trap width from the endpoint closer to an endpoint of the CTE. However, if the segment has a length greater than twice the trap width, the system adds two placeholder points to the segment, each at a distance equal to the trap width from a respective endpoint of the segment. The system can use different multiples of the trap width for comparison and placement (e.g., one half of the trap width).

In FIG. 10B, proceeding counter-clockwise around the composite trap polygon from endpoint 1018 of CTE 1010, the system does not test a segment 1020 between points 1018 and 1021 because segment 1020 is a side of composite trap polygon 1000. The system compares a segment 1022 between points 1021 and 1002 to the trap width corresponding to the appropriate side of CTE 1010 (the distances shown in FIG. 10B are exemplary and not necessarily to scale). Assuming the length of segment 1022 is more than the trap width but less than twice the trap width, a placeholder point 1024 is added to segment 1022 at a distance equal to the trap width from point 1021 (the endpoint of segment 1022 closest to an endpoint of CTE 1010). Similarly, for segment 1026, the system adds a placeholder point 1028. The system adds placeholder points 1030 and 1032 to segments 1034 and 1036, respectively. The system does not add placeholder points to segments 1038, 1040, 1042, 1044, and 1046 because these segments are not longer than the corresponding trap width (the trap width corresponding to the side of CTE 1010 where these segments are located). The system does not add placeholder points to segments 1048 and 1050 because these segments are sides of composite trap polygon 1000. Assuming the length of segment 1052 between points 1054 and 1056 is more than twice the trap width for the corresponding side of CTE 1010, the system adds two placeholder points 1058 and 1060 to segment 1052. The system adds placeholder points 1058 and 1060 at distances equal to the appropriate trap width from the points 1054 and 1056, respectively. The system does not add a placeholder point to segment 1062 because segment 1062 is a side of composite trap polygon 1000.

After adding the placeholder points to the composite trap polygon, the system generates movement vectors for each of the points of the composite trap polygon according to the type of the point and the distance to the nearest interfering edge (step 915). Different movement vectors can be generated for points which have been added to the trap polygon for different reasons.

Some points do not move. If the distance between a point and the nearest interfering edge is greater than a predetermined keep away threshold, such as the trap width, the system does not create a movement vector for the point. The system does not create a movement vector for the endpoints of the CTE.

For other points, the system determines a direction and distance for a movement vector for each point. For a point which coincides with another trap polygon (e.g., a point that is on a side of the composite trap polygon where the side was adjusted because of an interfering edge, as described above), the system generates a movement vector toward the closest endpoint of the CTE. For a point which was added as a trimming point at an intersection of an interfering edge and the original trap polygon or for an enclosed endpoint, the system generates a movement vector along the composite trap polygon toward a next point in the direction of the nearest endpoint of the CTE. The system adds to that movement vector another vector, if present, corresponding to the movement vector for that next point, as described below. For any remaining points, the system generates a movement vector toward the closest point on the CTE.

The system determines the distance for each movement vector using a predetermined distance so that after a point moves, the point is relatively closer to the CTE than to the closest interfering edge, such as approximately 20%. For the first vector for a trimming point which moves along the trap polygon, the distance is the lesser of the distance to the corresponding next point or the corresponding trap width. The second vector is the same as the vector for the corresponding next point. If the next point does not move, the trimming point only includes the first vector along the composite trap polygon. After generating appropriate movement vectors, the system applies the movement vectors to move the corresponding points, shaping the composite trap polygon (step 920).

In FIG. 10C, assuming the system added trimming point 1064 as the intersection between an interfering edge and composite trap polygon 1000, the system checks the distance between trimming point 1064 and placeholder point 1028. Assuming the distance between points 1064 and 1028 is less than the trap width, the system generates a first vector 1068 for point 1064 to move point 1064 to the position of point 1028. The system adds a second vector 1070, corresponding to the movement vector for placeholder point 1028. Similarly, the system associates vectors 1072 and 1074 with trimming point 1066. Hence, placeholder points 1028 and 1030 share vectors 1070 and 1074 with trimming points 1064 and 1066, respectively. Control points 1002 and 1004 have movement vectors 1076 and 1078, respectively. Trimming points 1080, 1082, 1084, and 1086 have movement vectors 1088, 1090, 1092, and 1094, respectively. Point 1096 in the corner of composite trap polygon 1000 has a movement vector 1097 to move point 1096 toward endpoint 1018 of CTE 1010. The remaining points do not move. FIG. 10D shows the resulting contracted trap polygon 1098 after applying the movement vectors.

FIG. 11 shows a computer system 1100 for performing the technique described above. A computer 1105 is connected to an imaging device, such as a page setter 1110. Computer 1105 executes a process to form a trap polygon for each CTE in an electronic document stored in computer 1105. After forming the trap polygons, computer 1105 sends the electronic document with the trap polygons to page setter 1110.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

In one implementation, such as that shown in FIG. 11, a computer system includes a processor, a random access memory (RAM), a program memory (for example, a writable read-only memory (ROM) such as a flash ROM), a hard drive controller, a video controller, and an input/output (I/O) controller coupled by a processor (CPU) bus. The system can be preprogrammed, in ROM, for example, or it can be programmed (and reprogrammed) by loading a program from another source (for example, from a floppy disk, a CD-ROM, or another computer). The hard drive controller is coupled to a hard disk suitable for storing executable computer programs, including programs embodying the present invention, and data including. The video controller is coupled to a video recorder, which can be used for storing and importing video footage and for writing final output. The I/O controller is coupled by means of an I/O bus to an I/O interface. The I/O interface receives and transmits data (e.g., stills, pictures, movies, and animations for importing into a composition) in analog or digital form over communication links such as a serial link, local area network, wireless link, and parallel link. Also coupled to the I/O bus is a display and a keyboard. Alternatively, separate connections (separate buses) can be used for the I/O interface, display and keyboard.

Numerous implementations of the invention have been described. However, additional variations are possible. For example, the sequence of non-order dependent steps can be different. The technique can be performed as one or more processes executing on one or more processors in a local or distributed system. Each trap polygon in a page can be formed independently or in parallel with other trap polygons. The technique can be applied to a bitmap space as well. The trap width can be set in various ways, such as user selection. A user selectable keep away zone parameter determines the multiple of the trap width for the width of the keep away zone. Each side of the keep away zone can have a corresponding parameter or a single parameter can be used for the entire zone to determine the zone width. The process can be applied to a page on a tile by tile basis.

What is claimed is:

1. A method of forming a trap polygon for trapping a color transition edge, where the trap polygon has an associated trap color determined by colors defining the color transition edge, the method comprising the steps of:

identifying one or more potentially interfering edges which intersect a keep away zone defined by the color transition edge;

screening the potentially interfering edges to identify interfering edges which are part of an object which is of a significantly different color than the trap color; and forming a trap polygon for trapping the color transition edge including shaping the trap polygon to avoid overlapping objects and any trap polygons corresponding to any identified interfering edges which are part of an object which is of a significantly different color than the trap color.

2. A method of forming a trap polygon for trapping a color transition edge, where the trap polygon has an associated trap color determined by colors defining the color transition edge, the method comprising the steps of:

identifying one or more potentially interfering edges which intersect a keep away zone defined by the color transition edge, wherein the keep away zone is within a tile, where the tile includes one or more tile edges and each potentially interfering edge is a tile edge which touches the keep away zone, and wherein the color transition edge is defined by two points and defines a transition between a first color and a second color, and the first color is on a same side of the color transition edge as an interfering edge and the second color is on an opposite side of the color transition edge from the interfering edge, where the interfering edge has an interfering color on one side which would satisfy a trap condition with the second color, and the interfering color and the second color indicate a hypothetical trap color which differs from the trap color by more than a vignette color transition;

screening the potentially interfering edges to identify interfering edges which are part of an object which is of a significantly different color than the trap color; and forming a trap polygon for trapping the color transition edge including shaping the trap polygon to avoid overlapping objects and any trap polygons corresponding to any interfering edges.

3. A method of forming a trap polygon for trapping a color transition edge, where the trap polygon has an associated trap color determined by colors defining the color transition edge, the method comprising the steps of:

identifying one or more potentially interfering edges which intersect a keep away zone defined by the color transition edge, wherein the keep away zone is within a tile, where the tile includes one or more tile edges and each potentially interfering edge is a tile edge which touches the keep away zone, and wherein the color transition edge is defined by two points and defines a transition between a first color and a second color, and the first color is on a same side of the color transition edge as an interfering edge arid the second color is on an opposite side of the color transition edge from the interfering edge, where the interfering edge has an interfering color on one side which would satisfy a trap condition with the second color, and the interfering color and the second color indicate a hypothetical trap color which differs from the trap color by more than a vignette color transition;

screening the potentially interfering edges to identify interfering edges which are part of an object which is of a significantly different color than the trap color; and forming a trap polygon for trapping the color transition edge including shaping the trap polygon to avoid overlapping objects and any trap polygons corresponding to any interfering edges, where the vignette color transition is approximately 5%.

4. A method of forming a trap polygon for trapping a color transition edge, where the trap polygon has an associated trap color determined by colors defining the color transition edge, the method comprising the steps of:

identifying one or more potentially interfering edges which intersect a keep away zone defined by the color transition edge, wherein the keep away zone is within a tile, where the tile includes one or more tile edges and each potentially interfering edge is a tile edge which touches the keep away zone, and wherein the color transition edge is defined by two points and defines a transition between a first color and a second color, and the first color is on a same side of the color transition edge as an interfering edge and the second color is on an opposite side of the color transition edge from the interfering edge, where the interfering edge has an interfering color on one side which would satisfy a trap condition with the second color, and the interfering color and the second color indicate a hypothetical trap color which differs from the trap color by more than a vignette color transition;

screening the potentially interfering edges to identify interfering edges which are part of an object which is of a significantly different color than the trap color; and forming a trap polygon for trapping the color transition edge including shaping the trap polygon to avoid overlapping objects and any trap polygons corresponding to any interfering edges, where the trap color has one or more trap colorant planes and the hypothetical trap color has one or more hypothetical color planes, and any trap colorant plane which would not overprint differs from a corresponding hypothetical colorant plane by more than the vignette color transition, and where a colorant plane which would overprint would not be printed when printing an object having a color including that colorant plane.

5. A method of forming a trap polygon for trapping a color transition edge, where the trap polygon has an associated trap color determined by colors defining the color transition edge, the method comprising the steps of:

identifying one or more potentially interfering edges which intersect a keep away zone defined by the color transition edge;

screening the potentially interfering edges to identify interfering edges which are part of an object which exceeds a vignette color transition than the trap color; and forming a trap polygon for trapping the color transition edge, including shaping the trap polygon to avoid overlapping objects and any trap polygons corresponding to any interfering edges and adding a control point to the trap polygon and moving the control point, where a control point is added to a segment of the trap polygon which exceeds a specified length.

6. A method of forming a trap polygon for trapping a color transition edge, where the trap polygon has an associated trap color determined by colors defining the color transition edge, the method comprising the steps of:

identifying one or more potentially interfering edges which intersect a keep away zone defined by the color transition edge;

screening the potentially interfering edges to identify interfering edges which are part of an object which is of a significantly different color than the trap color; and forming a trap polygon for trapping the color transition edge including shaping the trap polygon to avoid overlapping objects and any trap polygons corresponding to any interfering edges which are part of an object which is of a significantly different color than the trap color, wherein the trap polygon is defined by a plurality of points which are of one or more types, and wherein shaping the trap polygon further includes moving one or more points of the trap polygon according to the type of the point.

7. The method of claim 6, where a point of the trap polygon which coincides with an abutting trap polygon is moved in a direction of a closer endpoint of the color transition edge, where the abutting trap polygon shares one or more points with the trap polygon.

8. The method claim 6, where a point of the trap polygon which is on an interfering edge and is on the trap polygon is moved along the trap polygon toward a closer endpoint of the color transition edge.

9. The method of claim 6, where a point of the trap polygon is moved in a direction of the color transition edge.

10. A method of forming a trap polygon for trapping a color transition edge, where the trap polygon has an associated trap color determined by colors defining the color transition edge, the method comprising the steps of:

identifying one or more potentially interfering edges which intersect a keep away zone defined by the color transition edge;

screening the potentially interfering edges to identify interfering edges which are part of an object which is of a significantly different color than the trap color; and forming a trap polygon for trapping the color transition edge including shaping the trap polygon to avoid overlapping objects and any trap polygons corresponding to any interfering edges which are part of an object which is of a significantly different color than the trap color, wherein forming the trap polygon includes removing a co-linear point from a segment of the trap polygon, and wherein the co-linear point is co-linear with two adjacent points of the trap polygon.

11. A method of shaping a trap polygon for trapping a color transition edge, where the trap polygon has an associated trap color, the method comprising the steps of:

identifying one or more interfering edges which intersect a keep away zone defined by the color transition edge; and shaping a trap polygon so that corners of the trap polygon coincide, without overlapping, corners of trap polygons for any interfering edges which have an endpoint on or within a specified distance of an end point of the color transition edge, wherein shaping the trap polygon includes:

trimming the trap polygon, wherein trimming the trap polygon includes adjusting the trap polygon to avoid one or more interfering edges by adding trimming points to the trap polygon which coincide with points on the interfering edges which are in or on the trap polygon and removing points from the trap polygon which are outside the trimming points.

12. A method of shaping a trap polygon for trapping a color transition edge, where the trap polygon has an associated trap color, the method comprising the steps of:

identifying one or more interfering edges which intersect a keep away zone defined by the color transition edge; and shaping a trap polygon so that corners of the trap polygon coincide, without overlapping, corners of trap polygons for any interfering edges which have an endpoint on or within a specified distance of an endpoint of the color transition edge, wherein shaping the trap polygon includes:

adding a control point to the trap polygon and moving the control point, where a control point is added to a segment of the trap polygon which exceeds a specified length.

13. A method of shaping a trap polygon for trapping a color transition edge, where the trap polygon is defined by a plurality of points which are of one or more types, and where the trap polygon has an associated trap color, the method comprising the steps of:

identifying one or more interfering edges which intersect a keep away zone defined by the color transition edge; and shaping a trap polygon so that corners of the trap polygon coincide, without overlapping, corners of trap polygons for any interfering edges which have an endpoint on or within a specified distance of an endpoint of the color transition edge, where shaping the trap polygon further includes:

moving one or more points of the trap polygon according to the type of the point.

14. The method of claim 13, where a point of the trap polygon which coincides with a near trap polygon is moved in a direction of a closest endpoint of the color transition edge.

15. The method of claim 13, where a trimming point of the trap polygon which coincides with a point on the interfering edge which is in or on the trap polygon is moved in a direction of a next point along the trap polygon.

16. The method of claim 13, where a point of the trap polygon is moved in a direction of a closest point of the color transition edge.

17. A method of shaping a trap polygon for trapping a color transition edge, where the trap polygon has an associated trap color, the method comprising the steps of:

identifying one or more interfering edges which intersect a keep away zone defined by the color transition edge;

shaping a trap polygon so that corners of the trap polygon coincide, without overlapping, corners of trap polygons for any interfering edges which have an endpoint on or within a specified distance of an endpoint of the color transition edge, wherein shaping the trap polygon includes:

removing a co-linear point from a segment of the trap polygon, where the co-linear point is co-linear with two adjacent points of the trap polygon.

18. The method of claim 1, where the keep away zone encloses the trap polygon.

19. The method of claim 1, where the keep away zone is within a tile, where the tile includes one or more tile edges and each potentially interfering edge is a tile edge which touches the keep away zone.

20. The method of claim 19, where an interfering edge has a paper color on one side.

21. The method of claim 19, where the color transition edge is defined by two points and defines a transition between a first color and a second color, and the first color is on a same side of the color transition edge as an interfering edge and the second color is on an opposite side of the color transition edge from the interfering edge, and where the interfering edge has a color on one side which would satisfy a trap condition with the first color.

22. The method of claim 19, where the color transition edge is defined by two points and defines a transition between a first color and a second color, and the first color is on a same side of the color transition edge as an interfering edge and the second color is on an opposite side of the color transition edge from the interfering edge, where the interfering edge has an interfering color on one side which would satisfy a trap condition with the second color, and the interfering color and the second color indicate a hypothetical trap color which is significantly different from the trap color.

23. The method of claim 1, where forming the trap polygon includes:

shaping one or more edges of the trap polygon so that the trap polygon abuts without overlapping any abutting trap polygon based upon an interfering edge which intersects the color transition edge, and so that the trap polygon does not overlap any object edge which is within the keep away zone but does not intersect the color transition edge or any close trap polygon based upon an interfering edge which is within the keep away zone but does not intersect the color transition edge.

24. The method of claim 1, where forming the trap polygon includes trimming the trap polygon.

25. The method of claim 24, where trimming the trap polygon includes:

adjusting the trap polygon to avoid one or more interfering edges by adding trimming points to the trap polygon for points on any interfering edges which are in or on the trap polygon; and removing points from the trap polygon which are outside the trimming points.

26. The method of claim 25, where adjusting the trap polygon further comprises:

adding one or more control points to the trap polygon, where a control point is added to a segment of the trap polygon which exceeds a specified length;

moving the control points; and moving the trimming points.

27. The method of claim 24, where trimming the trap polygon includes:

adjusting the trap polygon to avoid one or more interfering edges by adding trimming points to the trap polygon for points on any interfering edges which are in or on the trap polygon; and removing points from the trap polygon which are obstructed from the color transition edge by an interfering edge.

28. The method of claim 1, wherein the trap polygon, the color transition edge, and the potentially interfering edges are vector-based representations.

29. The method of claim 11, where adjusting the trap polygon further comprises:

adding one or more control points to the trap polygon, where a control point is added to a segment of the trap polygon which exceeds a specified length;

moving the control points; and moving the trimming points.

30. The method of claim 1, where forming the trap polygon includes adjusting a corner of the trap polygon so that each point which is on an edge of the trap polygon and overlaps an overlapping trap polygon coincides with a corresponding point on the overlapping trap polygon.

31. The method of claim 1, where forming the trap polygon includes removing a portion of the trap polygon when segments of the trap polygon bisect one another.

32. The method of claim 31, where the portion removed does not include a centerpoint of the color transition edge.

* * * * *

UNITED STATES PATENT AND TRADEMARK OFFICE
CERTIFICATE OF CORRECTION

PATENT NO. : 6,697,078 B2
DATED : February 24, 2004
INVENTOR(S) : Douglas R. Becker, Richard A. Dermer and Dennis Mercer It is certified that error appears in the above-identified patent and that said Letters Patent is hereby corrected as shown below:

Column 16,
Line 59, please delete "arid" and insert -- and --.

Signed and Sealed this

Twelfth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,697,078 B2
DATED : February 24, 2004
INVENTOR(S) : Douglas R. Becker et al.

It is certified that error appears in the above-identified patent and that said Letters Patent is hereby corrected as shown below:

<u>Title page,</u>
Item [56], References Cited, U.S. PATENT DOCUMENTS, please add
-- 5,613,046   3/1997   395/109. --

Signed and Sealed this

Twenty-sixth Day of July, 2005

JON W. DUDAS
*Director of the United States Patent and Trademark Office*